Figures 1, 2:
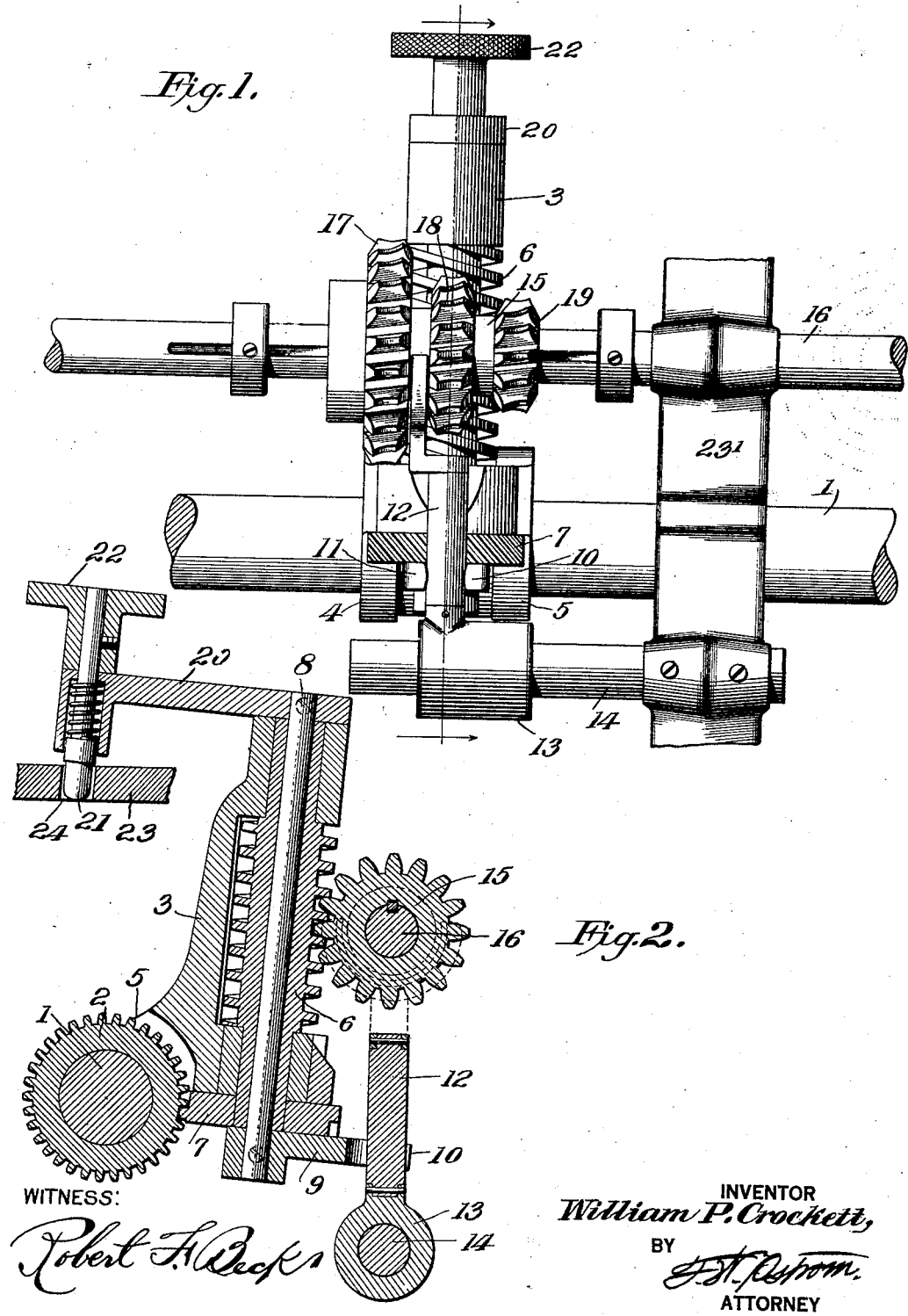

W. P. CROCKETT.
POWER TRANSMITTING MECHANISM.
APPLICATION FILED JAN. 16, 1917.

1,318,648. Patented Oct. 14, 1919.

WITNESS:
Robert F. Beck

INVENTOR
William P. Crockett,
BY
ATTORNEY

UNITED STATES PATENT OFFICE.

WILLIAM P. CROCKETT, OF HARRISON, NEW JERSEY, ASSIGNOR TO THE SINGER MANUFACTURING COMPANY, A CORPORATION OF NEW JERSEY.

POWER-TRANSMITTING MECHANISM.

1,318,648.   Specification of Letters Patent.   Patented Oct. 14, 1919.

Application filed January 16, 1917. Serial No. 142,606.

*To all whom it may concern:*

Be it known that I, WILLIAM P. CROCKETT, a subject of the King of the United Kingdom of Great Britain and Ireland, and resident of Harrison, in the county of Essex and State of New Jersey, have invented certain new and useful Improvements in Power-Transmitting Mechanisms, of which the following is a specification, reference being had therein to the accompanying drawings.

This invention relates to improvements in power transmitting mechanisms, and has for its object to provide a variable speed gear drive of substantial and reliable construction capable of manual control to vary the speed of the driven elements without arresting the action of the driving elements.

Referring to the drawings, which form a part of the specification, Figure 1 is an inverted plan view of the present improved means and Fig. 2 is a sectional elevation on the line A—A, Fig. 1.

It is not thought necessary to illustrate or describe the present invention as applied to any specific form of construction for effecting a given result or product, as it is applicable for use in connection with the transmitting of power generally.

Referring to the figures, 1 represents a rotary main or driving shaft carrying a gear member 2, 3 a gear carrying frame or yoke having spaced bearing lugs 4 and 5 arranged one at one side and the other at the opposite side of the gear member 2 and provided with suitable openings (not shown) through which passes the main-shaft 1, and into said yoke is journaled a tubular worm-gear 6 carrying a gear member 7 meshing with the gear member 2, thus transmitting from the main shaft rotary movements to said worm-gear.

8 represents a gear adjusting rod journaled in the tubular worm-gear and at one end provided with a forked connection 9 having the oppositely arranged shifting lugs 10 and 11 embracing the gear shifting connection 12 carrying at one end the tubular hub 13 slidably mounted on the fixed stud 14, and at its opposite end forked to embrace a gear carrying sleeve 15 mounted to slide on and rotate with the driven shaft 16, said gear carrying sleeve having suitably fixed upon it the spiral gear members 17, 18 and 19.

20 represents a gear shifting crank-arm suitably secured to the outer end of the gear adjusting rod 8 and provided with a spring-plunger 21 having suitably secured to it a knurled head 22, said crank-arm and parts carried by it being adjustable about the axis of the worm-gear to selected positions corresponding in number to the gears carried by the sleeve 15.

23 represents a stationary portion, as does 23', of a machine or device employing the present invention and 24 one of several openings, corresponding in number to the number of gear members carried by said sleeve, formed in said stationary portion to secure the gear member selected to coöperate with the worm-gear against accidental movement out of engagement with the latter.

When it is desired to change the speed of the shaft 16 the operator withdraws the plunger 21 from engagement with the opening 24 last employed and rocks the yoke or frame 3 about the main-shaft, thus causing the worm-gear to be disengaged from the last driven gear member carried by the sleeve 15 and through the crank-arm 20 oscillate the forked connection 9 to, through the shifting connection 12, move the selected gear member in position to be engaged by said worm-gear, when the yoke 3 is rocked in the opposite direction to bring into engagement with the worm-gear the selected gear-member, after which they are secured by the plunger 21 being seated into the opening 24 provided for the selected combination of coöperating gear members.

Having thus set forth the nature of the invention, what I claim herein is:—

1. In a power-transmitting mechanism, in combination, a driving shaft, a driven shaft, a gear-member carried by one of said shafts, a multiple of gear-members mounted to rotate and having sliding relationship with the other of said shafts, means for actuating said driven shaft from said driving shaft through the intermediary of any one of said multiple of gear-members, including an intermediate gear-member and a gear-adjusting rod independent of and co-axial with said intermediate gear-member.

2. In a power-transmitting mechanism, in combination, a driving shaft, a driven shaft, a gear-member carried by one of said shafts, a multiple of gear-members mounted to rotate and having sliding relationship with the other of said shafts, means for actuating said driven shaft from said driving shaft through the intermediary of any one of said multiple of gear-members, including an intermediate shaft, a plurality of intermediate gear-members carried by said shaft, and a gear-adjusting rod coaxial with said intermediate shaft.

3. In a power-transmitting mechanism, in combination, a driving shaft, a driven shaft, a gear-member carried by one of said shafts, a multiple of gear-members mounted to rotate and having sliding relationship with the other of said shafts, a yoke capable of oscillatory movements about the axis of one of said shafts, an intermediate shaft journaled in said yoke, a gear-adjusting rod supported by said yoke and arranged coaxially with said intermediate shaft, and means for actuating said driven shaft from said driving shaft including gearing carried by said intermediate shaft adapted to be put in mesh with any one of said multiple of gears by the actuation of said adjusting rod.

4. In a power-transmitting mechanism, the combination with a driving shaft, a gear-member carried thereby, a driven shaft, and a multiple of gear-members mounted to rotate and having sliding relationship with said driven shaft, of means including a gear-adjusting rod, a gear-member and a worm-gear having the same axis of rotation, and a gear shifting connection actuated from said rod for effecting transmission of power between the gear-member carried by said driving shaft and any one of the multiple gear-members carried by said driven shaft selected at will.

5. In a power-transmitting mechanism, the combination with a driving shaft, a gear-member carried thereby, a driven shaft, and a multiple of gear-members mounted to rotate and having sliding relationship with said driven shaft, of means for effecting dissimilar ratios of speed between said driving and driven shafts, including a gear shifting connection, a yoke capable of oscillatory movement and provided with a gear-member, a worm-gear and a forked connection, the latter acting on said gear shifting connection to shift said multiple of gear-members into selected relationship with said worm-gear.

6. In a power-transmitting mechanism, in combination with a driving shaft, a gear-member carried thereby, a driven shaft, and a multiple of gear-members mounted to rotate and having sliding relationship with said driven shaft, of means including a coaxially arranged gear-adjusting rod, a gear-member and worm-gear independent of said rod for effecting transmission of power between the gear-member carried by said driving shaft and any one of the multiple gear-members carried by said driven shaft, and means for holding said worm-gear in driving relationship with the selected gear-member except at will.

7. In a power-transmitting mechanism, in combination, a driving shaft, a gear-member carried thereby, a driven shaft, a multiple of gear-members mounted to rotate and having sliding relationship with said driven shaft, a yoke capable of oscillatory movements about the axis of said driving shaft in a single plane only, and an oscillating gear-adjusting rod, a gear-member and a worm-gear independent of said rod carried by said yoke for effecting transmission of power between the gear-member carried by said driving shaft and any one of said multiple gear-members selected at will.

8. In a power-transmitting mechanism, the combination with a driving shaft, a gear-member carried thereby, a driven shaft, and a multiple of gear-members mounted to rotate and having sliding relationship with said driven shaft, of a gear shifting connection, a yoke capable of swinging movements about the axis of said driving shaft, a tubular worm-gear journaled in said yoke and carrying a gear-member meshing with the gear-member carried by said main-shaft, a gear-adjusting rod journaled in said worm-gear and carrying at one end a gear shifting crank-arm and at its opposite end a forked connection, the latter acting on said gear shifting connection to shift said multiple gear-members into selected relationship with said worm-gear for effecting dissimilar ratios of speed between said driving and driven shafts.

9. In a power-transmitting mechanism, the combination with a driving shaft, a gear-member carried thereby, a driven shaft, and a multiple of gear-members mounted to rotate and having sliding relationship with said driven shaft, of means including a gear-adjusting rod provided with a crank-arm, a gear-member and a worm-gear for effecting transmission of power between the gear-member carried by said driving shaft and any one of the multiple gear-members carried by said driven shaft selected to best meet operative requirements.

10. In a power-transmitting mechanism, in combination, a driving shaft, a driven shaft, a gear-member carried by said driving shaft, and a multiple of gear-members mounted to rotate and having sliding relationship with said driven shaft, a yoke mounted for oscillatory movement upon said driving shaft, intermediate gearing carried by said yoke, a gear-adjusting rod arranged coaxially with said intermediate gearing, an operative connection between said gear-adjusting rod and said multiple of gearing to shift the latter endwise of the driven shaft, and a manually operable element carried by said gear-adjusting rod for first oscillating said yoke about the axis of the driving shaft and then shifting said multiple of gears laterally to meet speed requirements.

In testimony whereof I have signed my name to this specification in the presence of two subscribing witnesses.

WILLIAM P. CROCKETT.

Witnesses:
 ALVIN H. BOSS,
 STANLEY N. SMITH.

Copies of this patent may be obtained for five cents each, by addressing the "Commissioner of Patents. Washington, D. C."